(12) United States Patent
Suzuki et al.

(10) Patent No.: US 6,877,872 B2
(45) Date of Patent: Apr. 12, 2005

(54) SPREAD ILLUMINATING APPARATUS WITH LENTICULAR ELEMENTS

(75) Inventors: Shingo Suzuki, Iwata-gun (JP); Motoji Egawa, Iwata-gun (JP)

(73) Assignee: Minebea Co., Ltd., Kitasaku-gun (JP)

(*) Notice: Subject to any disclaimer, the term of this patent is extended or adjusted under 35 U.S.C. 154(b) by 0 days.

(21) Appl. No.: 10/439,181

(22) Filed: May 16, 2003

(65) Prior Publication Data

US 2004/0012944 A1 Jan. 22, 2004

(30) Foreign Application Priority Data

Jul. 19, 2002 (JP) ........................................ 2002-211203

(51) Int. Cl.$^7$ ................................................. F21V 8/00
(52) U.S. Cl. ........................... 362/31; 362/26; 362/339
(58) Field of Search ........................... 362/26, 31, 330, 362/339

(56) References Cited

U.S. PATENT DOCUMENTS

2002/0163790 A1 * 11/2002 Yamashita et al. ............ 362/31

* cited by examiner

Primary Examiner—John Anthony Ward
Assistant Examiner—Guiyoung Lee
(74) Attorney, Agent, or Firm—Oliff & Berridge, PLC

(57) ABSTRACT

A plurality of minute lenticular elements made of a light-transmissible material and each having a substantially plano-convex cross section are formed on a major surface of a light conductive plate opposite to another major surface provided with a light reflection pattern, and are arranged radially with respect to a spot-like light source with their respective longitudinal directions oriented perpendicular to grooves of the light reflection pattern. Light rays guided in the lenticular element from its bottom surfaces are spread in a circumferential direction of its outer curved surfaces. A view field angle can be increased by the lenticular element in a direction tangential to the grooves improving view field angle distribution.

12 Claims, 10 Drawing Sheets

Direction B   Direction A

SPREAD ILLUMINATING APPARATUS WITH LENTICULAR ELEMENTS

BACKGROUND OF THE INVENTION

1. Field of the Invention

The present invention relates to a spread illuminating apparatus, and particularly to a spread illuminating apparatus used as an illuminating means for a liquid crystal display.

2. Description of the Related Art

A liquid crystal display characterized by its low profile and light-weight has been extensively used in electric products including cellular phones and personal computers, and the demand thereof has been increasing. However, since a liquid crystal of the liquid crystal display (hereinafter, referred to as "LCD") does not emit light by itself, a separate illuminating means for illuminating the LCD is needed besides the LCD when used in dark places where sunlight or room light is not satisfactorily available.

The illuminating means used for the cellular phones and personal computers (especially, notebook computers) is required to be low in profile and small in power consumption. To meet the above demand, a sheet-like spread illuminating apparatus of side light type is often applied as an illuminating means. FIG. 12 shows an example of such a spread illuminating apparatus of a side light system.

A spread illuminating apparatus 1 shown in FIG. 12 is an embodiment of a conventional spread illuminating apparatus for what is called "a back-light system", and is disposed with its front surface 7 facing a back surface (upper side in FIG. 12) of a light-transmissible type LCD 2 opposite to a display surface F (lower side in FIG. 12). Here, the LCD may alternatively be semi-light transmissible.

The spread illuminating apparatus 1 comprises a substantially rectangular light conductive plate (guide-plate) 3 made of a light-transmissible material, a light conductive bar (guide-rod) 4 made of a light-transmissible material and shaped rectangular in cross section, and a pair of spot-like light sources 5 and 5 using light emitting diodes (LEDs).

The light-transmissible type LCD 2 is disposed in such a manner as to face the front surface 7 of the light conductive plate 3 opposite to a back surface 6 (upper side in FIG. 12). And, usually a reflector plate (not shown) is placed on the back surface 6.

The light conductive bar 4 is disposed such with its one side surface 8 located close to or in contact with one end surface 9 of the light conductive plate 3, and the spot-like light sources 5 and 5 are disposed respectively at both ends faces 10 and 10 of the light conductive bar 4. An optical path conversion means 12 is formed on the other side surface 11 of the light conductive bar 4 opposite to the one side surface 8 in order to allow light rays emitted from the spot-like light sources 5 and 5 to enter the light conductive plate 3 through the one end surface 9. The optical path conversion means 12 comprises a plurality of grooves 13 substantially V-shaped in cross section and a plurality of flat portions 14 formed therebetween.

The light conductive plate 3 has a light reflection pattern 15 on its back surface 6 so as to uniformly reflect the light rays guided from the light conductive bar 4 into the light conductive plate 3 through the surface 8 located close to or in contact with the one end surface 9 of the light conductive plate 3 toward its front surface 7.

The light reflection pattern 15 comprises a plurality of grooves 16 substantially V-shaped in cross section extending in parallel with the one end surface 9 of the light conductive plate 3 and a plurality of flat portions 17 formed therebetween.

With the structure above described, the light rays emitted from the spot-like light sources 5 and 5 enter the light conductive bar 4, have their paths changed by the optical path conversion means 12 formed on the side surface 11 of the light conductive bar 4 and enter the light conductive plate 3 through the one end surface 9.

The light rays introduced into the light conductive plate 3 are repeatedly reflected and refracted by the light reflection pattern 15, and proceed toward an end surface thereof opposite to the end surface 9 during which time-most of the light rays go out of the light conductive plate 3 through the front surface 7. Thus, the light-transmissible type LCD 2 set close to the front surface 7 of the light conductive plate 3 can be illuminated so that the light-transmissible type LCD 2 performs luminescent display (indirect luminescence).

However, with the above structure, a certain amount of the light emitted from the spot-like light sources 5 and 5 is consumed by the light conductive bar 4, therefore decreasing that amount of the light to illuminate the light conductive plate 3. As a countermeasure for the above disadvantage, a spread illuminating apparatus has been disclosed in Japanese Patent Publication No. 2001-35222.

In the spread illuminating apparatus disclosed in Japanese Patent Publication No. 2001-35222, as shown in FIG. 13, a light entrance surface 21 is formed at one corner 18 of the light conductive plate 3 in such a manner as to make a right angle with respect to a line (hereinafter referred to as "diagonal line") 20 connecting the one corner 18 and another corner 19 opposite to the corner 18, the spot-like light source 5 using a light emitting diode is arranged close to or in contact with the light entrance surface 21, a light reflection pattern 15A, which comprises a plurality of arced grooves 16A disposed concentric with respect to the spot-like light source 5 and arrayed at a regular interval, and a plurality of flat portions 17A formed between adjacent grooves 16A is formed on a top surface of the light conductive plate 3, and the light conductive bar 4 employed in the apparatus shown in FIG. 12 is eliminated. Consequently, the light rays emitted from the spot-like light source 5 directly enter the light conductive plate 3, thus cutting the light loss due to the presence of the light conductive bar 4.

In addition, the present inventors have disclosed, in Japanese Patent Application No. 2001-350161, a spread illuminating apparatus, in which each of the grooves 16A has its depth increasing from the diagonal line in order to improve the luminance distribution of the light reflection pattern 15A in a circumferential direction.

However, in the apparatus shown in FIG. 13, depending on the viewing direction, the field of view is restricted. The luminance distribution is measured by a luminance meter 70 set over the light conductive plate 3 in "direction A" tangential to each of the grooves 16A, and in "direction B" orthogonal to each of the grooves 16A as shown in FIGS. 14 and 15, and the resultant luminance distribution characteristics are different as shown in FIGS. 16 and 17. In the direction A, only a slight shift of an angle Φ from a datum 71 (defined as having an angle Φ of 0 degrees) causes the luminance to decrease sharply as shown in FIG. 16. In other words, when viewing angle is only slightly changed from the datum 71, darkness emerges instantly, thus resulting in a narrow field of view in the direction A. This is caused as follows. When the light conductive plate 3 (or the light reflection pattern 15A) is viewed from above, the light rays emitted from the spot-like light source enter the light conductive plate 3 and are incident vertically on the grooves 16A of the light reflection pattern 15A, and consequently are reflected by the grooves 16A and exit out the light conductive plate 3 without slanting in the direction A, therefore going out vertically.

SUMMARY OF THE INVENTION

The present invention has been made in light of the above problems, and it is an object of the present invention to provide a spread illuminating apparatus with an increased field of view.

(1) In order to achieve the above object, according to a first aspect of the present invention, there is provided a spread illuminating apparatus comprising a light conductive plate shaped substantially rectangular and made of a light-transmissible material, a spot-like light source disposed close to or in contact with a light entrance surface formed at either a side surface or a corner of the light conductive plate, a light reflection pattern formed on a major surface of the light conductive plate and including a plurality of grooves which each extend so as to shape a substantially minor arc with respect to the spot-like light source and which are arrayed concentrically; and a plurality of lenticular elements made of a light-transmissible material, provided on a major surface of the light conductive plate opposite to the major surface provided with the light reflection pattern, and having their respective longitudinal directions oriented perpendicular to the plurality of grooves of the light reflection pattern.

Without the above-described plurality of lenticular elements, only a slight deflection of viewing position from a datum in a circumferential direction of the grooves instantly creates darkness, thereby creating a narrow field of view in the circumferential direction. But, the above-described plurality of lenticular elements can widen the narrow field of view in the circumferential direction, thereby improving a view field distribution.

The above-described lenticular elements of the first aspect also have the following subsidiary aspects:

(2) A spread illuminating apparatus, in which lenticular elements are each rectangular in a top plan view.

(3) A spread illuminating apparatus, in which lenticular elements are each substantially trapezoidal in a top plan view, and have their respective shorter sides of two parallel sides facing the spot-like light source.

The immediate-above configuration can realize open areas between any adjacent lenticular elements which are narrower than those of (2).

(4) A spread illuminating apparatus, in which lenticular elements are of various lengths measuring in a wide range.

(5) A spread illuminating apparatus, in which lenticular elements are mostly of a length identical with one another except smaller number thereof being of various lengths measuring in a narrow range; The immediate-above configuration can make it easier to manufacture, thereby improving productivity thereof (6) A spread illuminating apparatus, in which lenticular elements each have a cross section outlined by a minor arc and a chord connecting two points both defining minor arc.

(7) A spread illuminating apparatus, in which lenticular elements each have their respective widths and heights set such that view field angles thereof range from 5 degrees to 20 degrees preferably 10 degrees to 20 degrees.

The immediate-above configuration can prevent a wider distribution of view field than necessary.

(8) A spread illuminating apparatus, in which lenticular elements and the light conductive plate are formed integrally of one same material.

(9) A spread illuminating apparatus, in which lenticular elements and the light conductive plate are formed discretely.

DETAILED DESCRIPTION OF THE PREFERRED EMBODIMENTS

The preferred embodiments of a spread illuminating apparatus in accordance with the present invention will hereinafter be explained with reference to the accompanying drawings.

Figure 12:
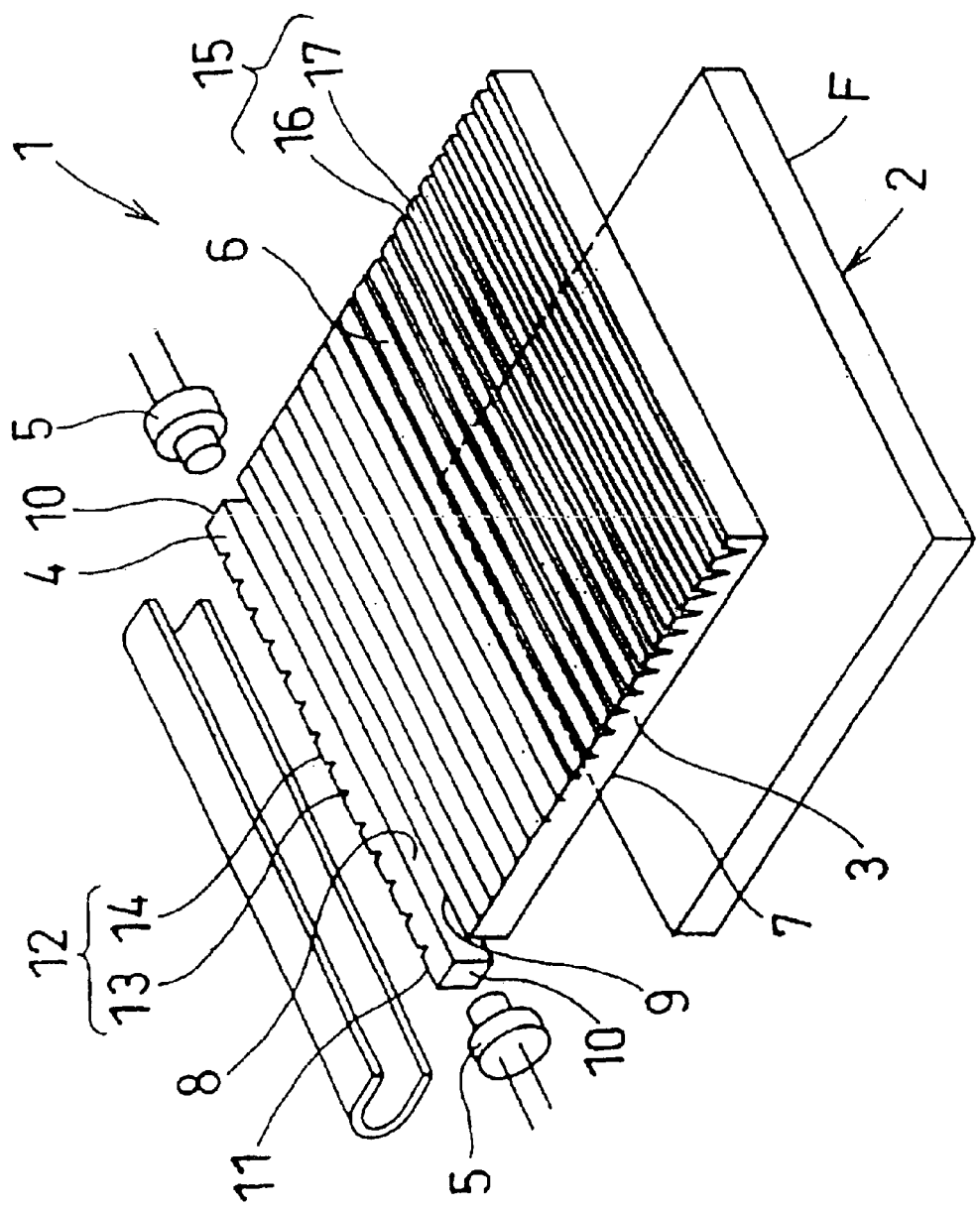
FIG. 12 shows an exploded perspective view of a conventional spread illuminating apparatus.
Figure 13:
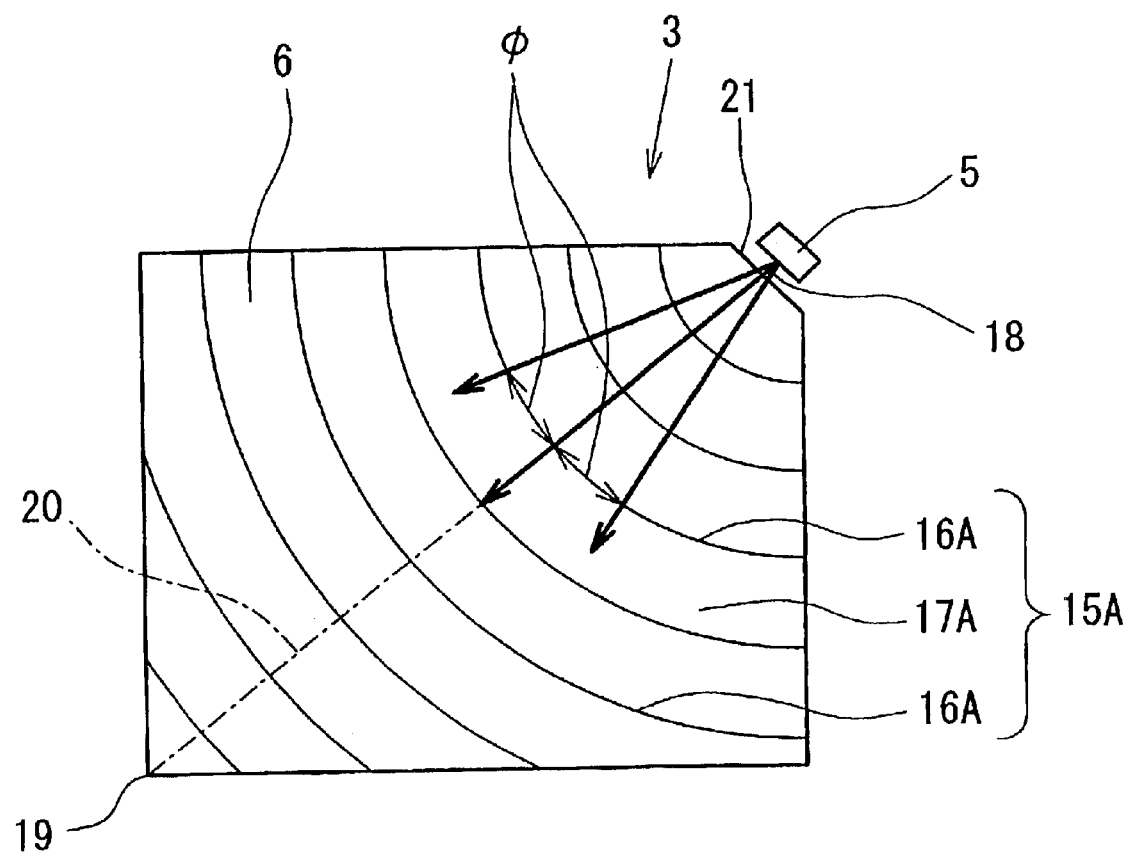
FIG. 13 shows a rear view of a spread illuminating apparatus having a light emitting diode disposed close to a corner of a light conductive plate.
Figure 14:
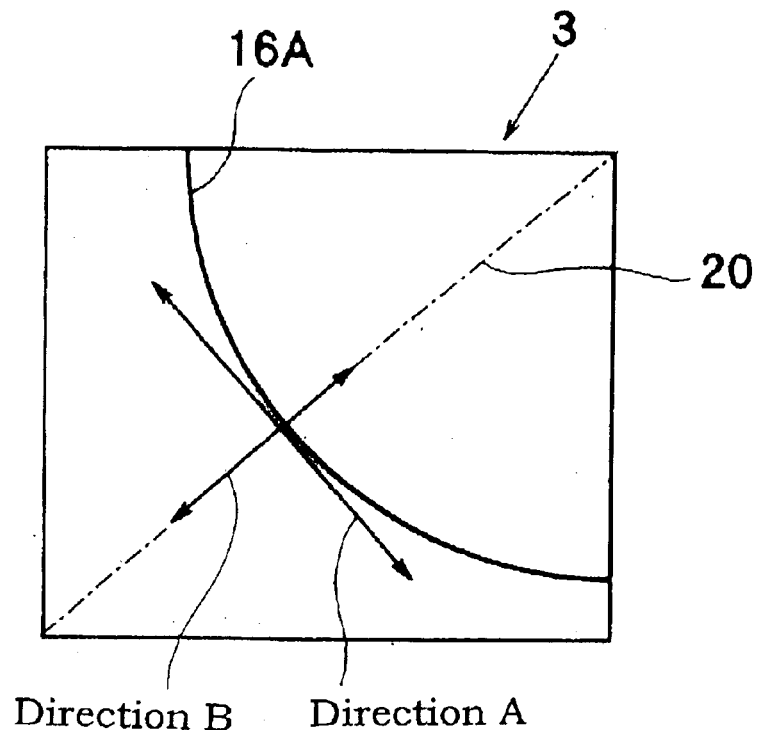
FIG. 14 shows a rear view of a light conductive plate for indicating directions A and B of luminance distribution.
Figure 15:
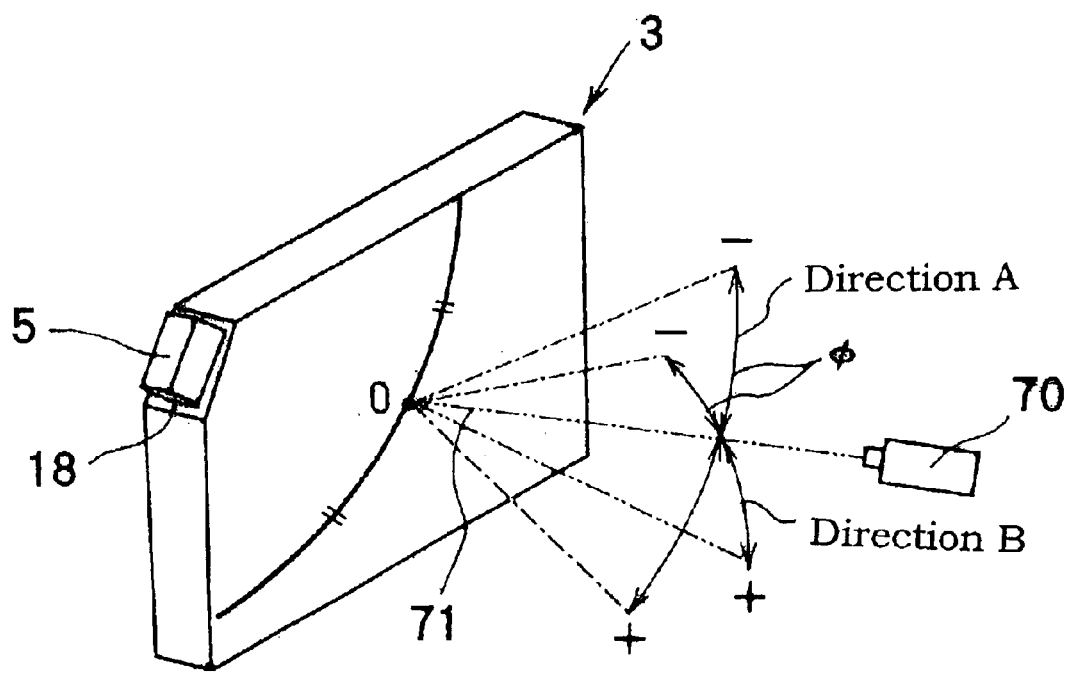
FIG. 15 shows a perspective view of the light conductive plate for illustrating how to measure luminance by using a luminance meter.
Figure 16:
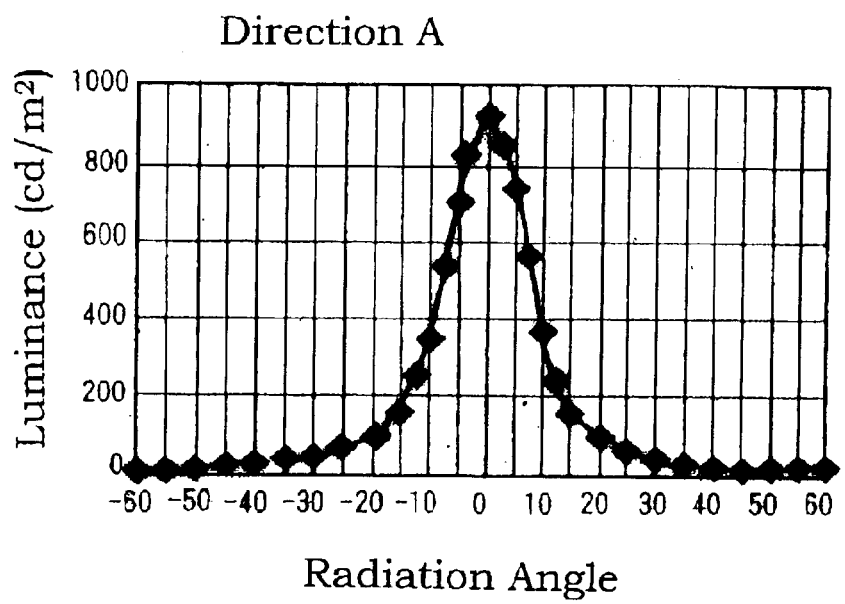
FIG. 16 shows a relation between a radiation angle and a luminance in the direction A of the light conductive plate shown in FIG. 13.
Figure 17:
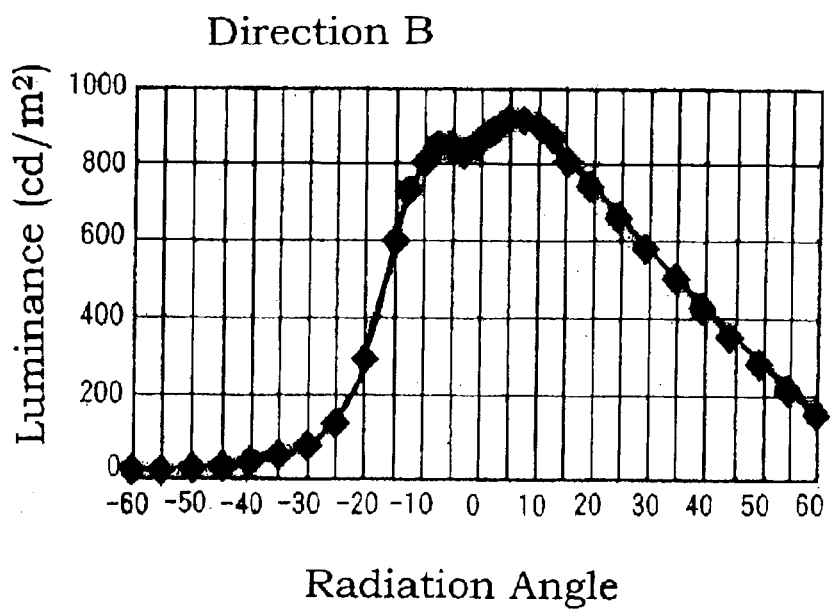
FIG. 17 shows a relation between a radiation angle and a luminance in the direction B of the light conductive plate shown in FIG. 13.

A first embodiment of the present invention will be described with reference to FIGS. 1 to 5, FIGS. 7 and 8, and also to FIGS. 6 and 12. In the drawings, sections and components that are the same as or equivalent to those in the conventional embodiment shown in FIGS. 12 to 15 are represented by the same reference alphanumeric characters, and detailed descriptions thereof are omitted.

Figure 1:
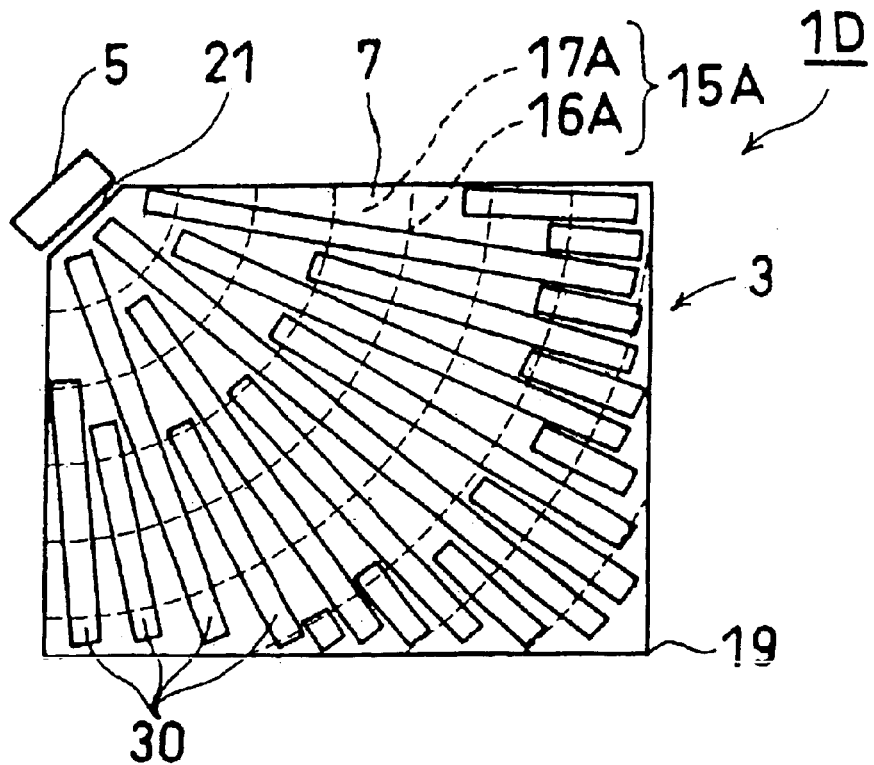
FIG. 1 shows a top plan view of a spread illuminating apparatus according to a first embodiment of the present invention.
Figure 2:
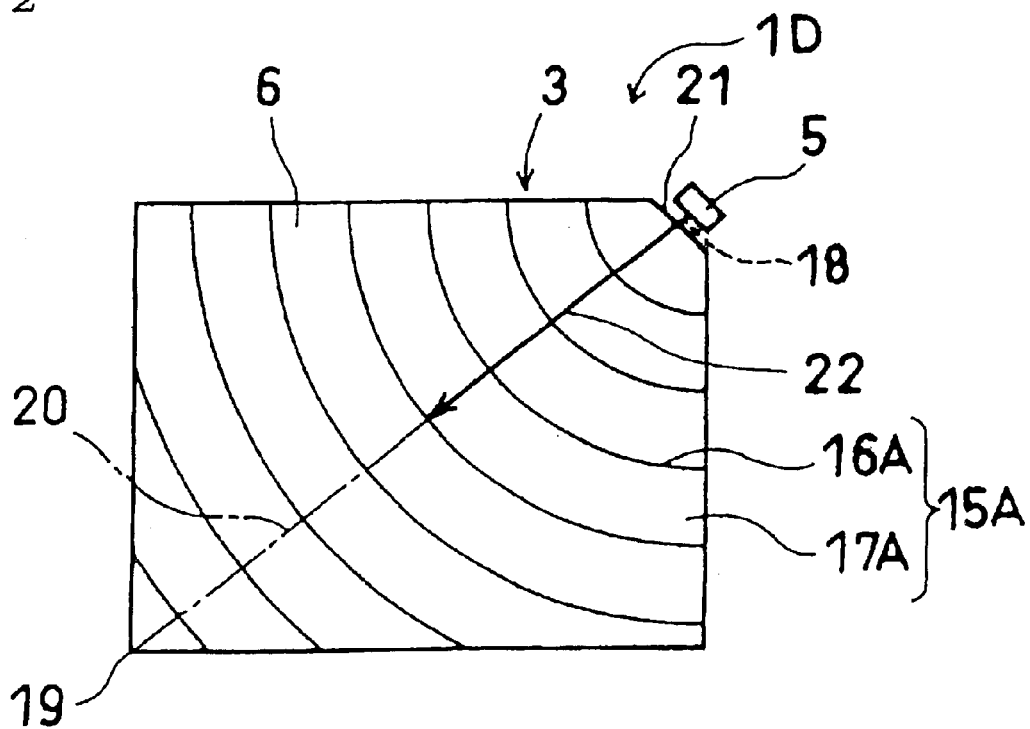
FIG. 2 shows a rear view of the spread illuminating apparatus shown in FIG. 1.

Referring to FIGS. 1 and 2, a spread illuminating apparatus 1D is what is called "a backlight system", in which a light conductive plate 3 is disposed with its front surface 7 facing a back surface of a light-transmissible type liquid crystal display (LCD).

The spread illuminating apparatus 1D comprises the above-described light conductive plate 3 made of a light-transmissible material and shaped substantially rectangular, and a spot-like light source 5 consisting of a light emitting diode (LED) and disposed close to the light conductive plate 3.

Figure 18:
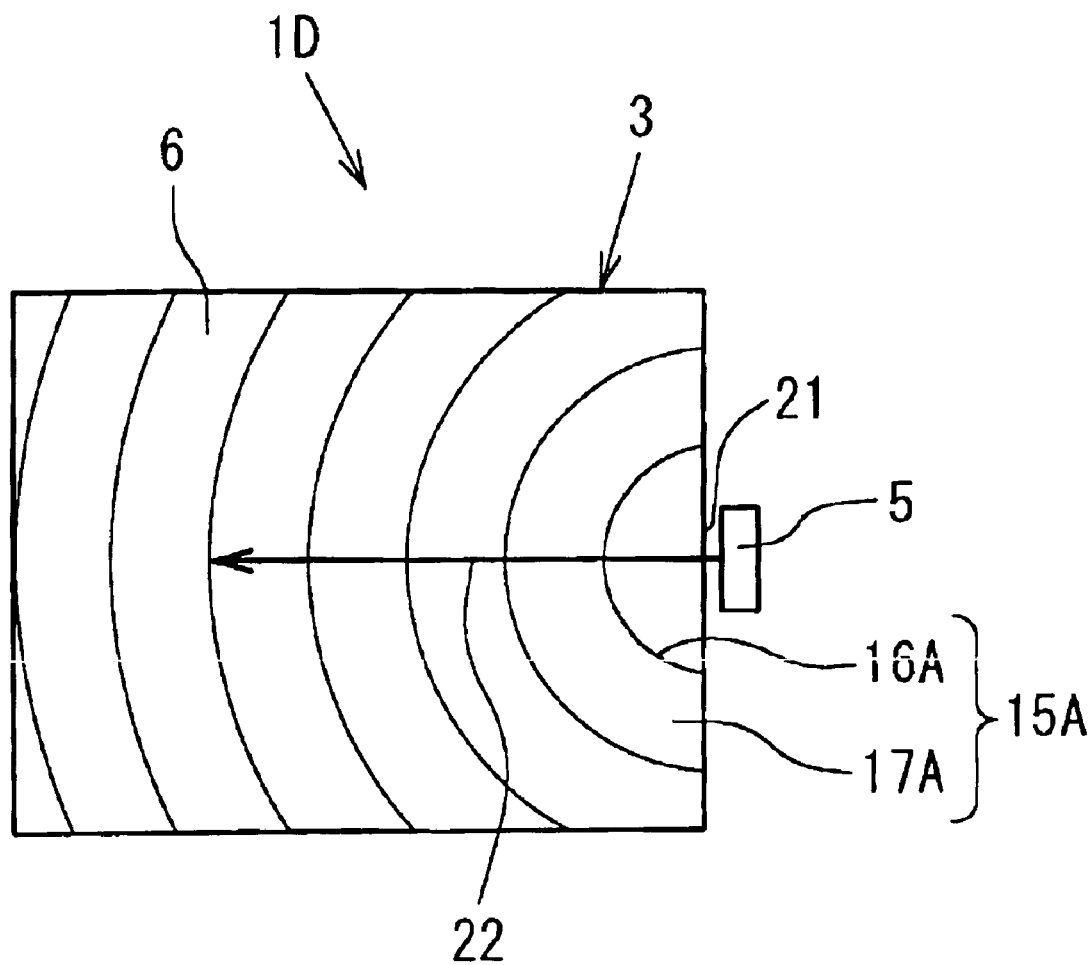
FIG. 18 shows a view of the spread illuminating apparatus having a light emitting diode disposed at the side surface of the light conductive plate.

A light entrance surface 21 is formed at one corner 18 of the light conductive plate 3 in such a manner as to make a right angle with respect to a line (hereinafter referred to as "diagonal line") 20 connecting the one corner 18 and another corner 19 opposite to the one corner 18, and the spot-like light source 5 is set to face the light entrance surface 21. Alternatively, the spot-like light source 5 is set close to or in contact with the light entrance surface 21 formed at a side surface of the light conductive plate 3 in such a manner that the light reflect pattern is formed concentrically to the optical axis 22 (see FIG. 18). A light reflection pattern 15A is formed on a back surface 6 of the light conductive plate 3 such that a display surface F (see FIG. 12) of the light-transmissible type LCD can be illuminated in a uniform manner entirely.

The light reflection pattern ISA comprises a plurality of arced grooves 16A disposed concentric with respect to the spot-like light source 5 and at a regular interval, and a plurality of flat portions 17A each formed between adjacent grooves 16A. The grooves 16A each have a V-shaped cross section and have their depths increasing with an increase in the distance from the spot-like light source 5. In addition, each of the grooves 16A has its depth gradually increasing with an increase in the distance from the diagonal line 20 or optical axis 22 shown in FIG. 2 or FIG. 18, respectively, in view of a luminance distribution in a circumferential direction. In this connection, alternatively the grooves 16A, while keeping a constant depth, may be arrayed, rather than "at a regular interval" such that the interval between two adjacent grooves 16A decreases with an increase in the distance from the spot-like light source 5. Here, the grooves 16A may have their depths increasing with en increase in the distance from the spot-like light source 5. One groove does not necessarily have to be uninterrupted but may be interrupted at a plurality of spots. The grooves 16A can be configured in any manner as long as light rays are evenly spread on the front surface 7 of the light conductive plate, and may be configured to have a polygonal cross section including a rectangular or to have a cross section with a combination of curved surfaces and flat surfaces.

Further, the light reflection pattern 15A is not limited to the above-described configuration with the plurality of grooves 16A and the plurality of flat portions 17A formed therebetween, but alternatively exclude flat portions and comprises only a plurality of arc grooves arrayed continuously. A plurality of minute lenticular elements 30 each having a substantially plano-convex cross section are integrally formed on the front surface 7 of the light conductive plate 3 opposite to the back surface 6. In other words, the light conductive plate 3 and the plurality of minute lenticular elements 30 are integrally made of the same material.

In FIG. 1, the lenticular elements 30 are exaggeratingly enlarged for the sake of convenience. Also, in FIGS. 9 and 10, the lenticular elements 30 and 30F are exaggeratingly enlarged. The plurality of lenticular elements 30 are formed in such a manner as to extend radially with respect to the spot-like light source 5 with their longitudinal direction oriented perpendicular to the grooves 16A of the light reflection pattern 15A.

Figure 3:
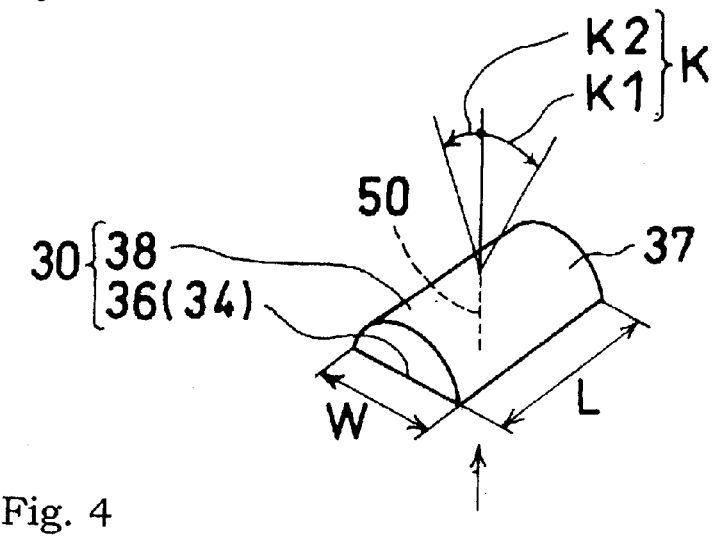
FIG. 3 shows a perspective view of a lenticular element shown in FIG. 1.
Figure 4:
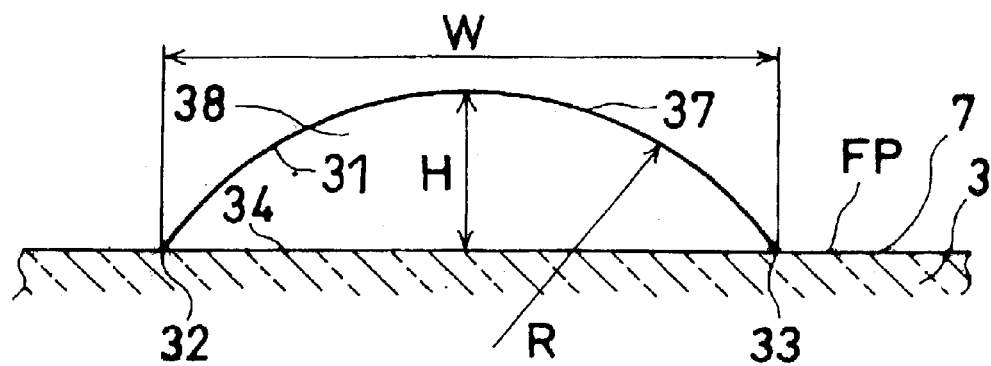
FIG. 4 shows a profile view of the lenticular element and a light conductive plate shown in FIG. 1.

Referring to FIG. 3, each lenticular element 30 has a configuration that is a smaller half if a cylinder split unequally into two longitudinal direction. As shown in FIG. 4, the lenticular element has a plano-convex cross section orthogonal to the longitudinal direction, specifically the cross section is outlined by a minor arc 31 and a chord 34 connecting two points 32 and 33 located respectively at both ends of the minor arc 31. Each of the lenticular elements 30 generally comprises a rectangular bottom surface 36 having the chord 34 as its one side and a prism surface 38 whose outer circumference 37 corresponds to the minor arc 31 and has a rectangular shape in a top plan view corresponding to the shape of the bottom surface 36 (see FIGS. 1 and 3).

Width W of each lenticular element 30 is set to be 10 to 300 μm, preferably less than 100 μm to achieve an even spread light emission. Length of the chord 34, that is, the width of the bottom surface 36, corresponds to the width W of each lenticular element 30, and therefore, will hereinafter be appropriately denoted with W Height H of each lenticular element 30 is predetermined. Height of the prism surface 38 from the bottom surface 36 corresponds to the height H of each lenticular element 30, and therefore will hereinafter be appropriately denoted with H.

The plurality of lenticular elements 30 vary in length (corresponding to the length of the bottom surface 36) very widely from one another.

The plurality of lenticular elements 30 are arranged on the front surface 7 of the light conductive plate 3 as follows.

First, longer elements (indicated with 30 in FIG. 1) are arranged in such a manner as to extend radially with respect to the spot-like light source 5. Then, shorter elements are arranged in order of length in such a manner as to extend radially with respect to the spot-like light source 5 and to cover open area as closely as possible. Thus, the area density of arrangement of the lenticular elements 30 (a ratio in a given area of an area with presence of the lenticular element 30 to an area of absence of the lenticular element 30) is set to be substantially equal everywhere on the front surface 7.

Figure 5:
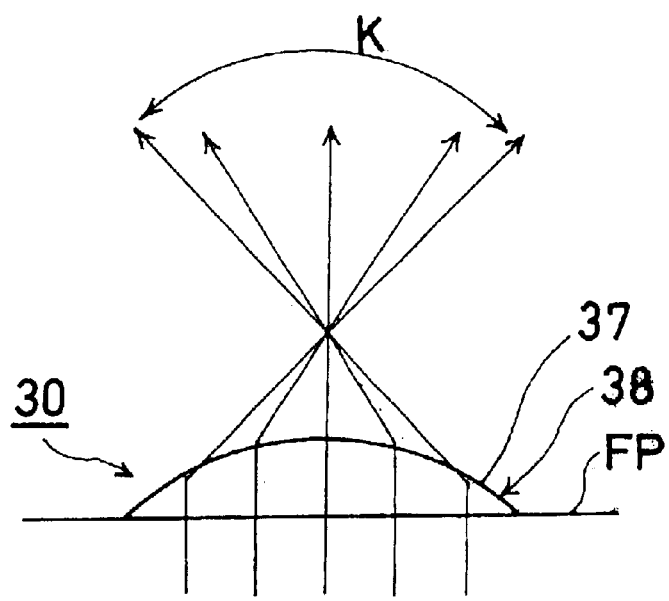
FIG. 5 shows a schematic profile view of a spread of light rays by the lenticular element shown in FIG. 1.

As shown in FIG. 5, when each lenticular element 30 receives incident light rays through its bottom surface 36, it is adapted to widen a range of the light rays (that is, a view field angle distribution) in a circumferential direction K of the outer circumference 37 of the prism surface 38 (a direction perpendicular to the longitudinal direction of each of the lenticular elements 30). In this embodiment, the lenticular elements 30 are arranged in such a manner as to extend radially with respect to the spot-like light source 5 and in a direction perpendicular to the grooves 16A of the light reflection pattern 15A, so the view field angle distribution in the circumferential direction (tangential direction) at the grooves 16A is increased.

The height H of the lenticular elements 30 in relation with the width W thereof can be a parameter to determine an optical characteristic (field of view). Specifically, since the cross section of the lenticular elements 30 comprises the minor arc 31, when any two factors of the height H, width W, and radius R of a circle including the minor arc 31 are determined, the remaining one factor can be automatically gained.

For example, if the height H and width W are determined, the radius R of a circle including the minor arc 31 can be automatically gained.

As described above, each lenticular element 30 does not have a semicircular cross section, but have a plano-convex cross section (a shape surrounded by the minor arc 31 and the chord 34 connecting the two points 32 and 33 which define the minor arc 31). If the lenticular elements 30 are formed to have semicircular cross section, a peak luminance (luminance at front) of the spread illuminating apparatus is lowered. The phenomenon will be explained with reference to FIG. 6.

Figure 6:
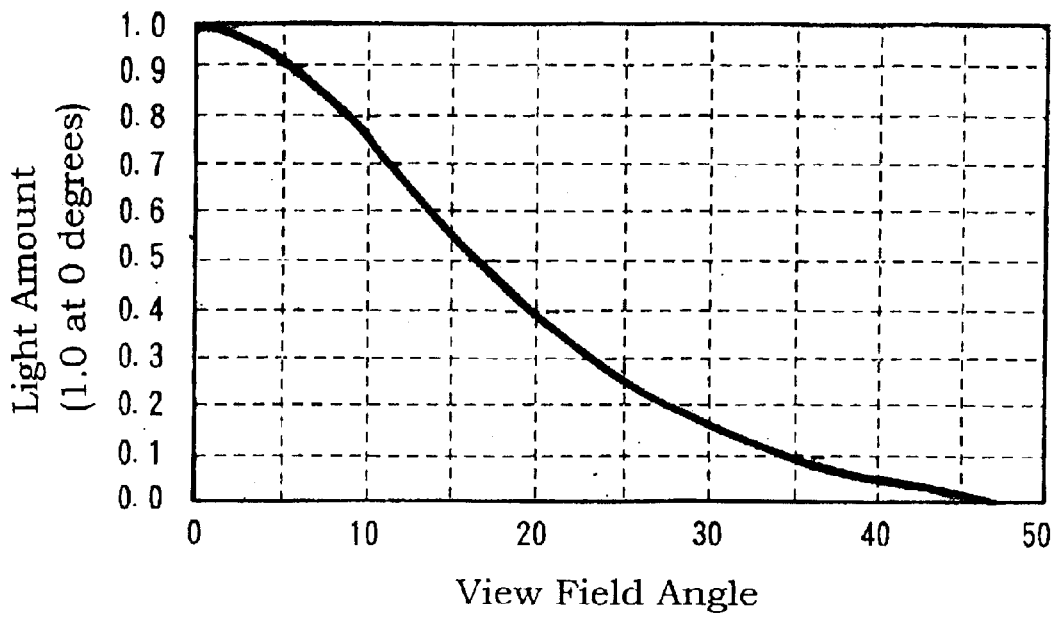
FIG. 6 shows a relation between a view field angle and a light amount of the lenticular element shown in FIG. 1.

FIG. 6 shows a view field angle distribution by a lenticular element (not shown) which has a semicircular cross section (that is, H/W=0.5). The view field angle distribution shown in FIG. 6 is provided at one side K1 a right direction with respect to a line 50 perpendicular to the bottom surface 36 in FIG. 3) in the circumferential direction of the outer circumference 37 (its view field angle is 0 degrees) as shown in FIG. 3. Although not shown in FIG. 6, the lenticular element (not shown) provides at the other side K2 opposite to the one side K1 in the circumferential direction a view field angle distribution symmetrical with the one provided at the one side K1. And, it is assumed that the lenticular element scarcely affects a view field angle distribution in a direction perpendicular to the circumferential direction K (that is a direction of the length L of the lenticular element).

The lenticular element (not shown) having the above-described semicircular cross section provides a very wide view field angle distribution, and the peak luminance of the spread illuminating apparatus is decreased to that rate. The relation of the height H of the lenticular element with its width W must be adjusted in order to prevent the view field angle distribution from becoming too wide, thereby optimizing the peak luminance (luminance at front). Specifically, the view field angle is preferably set to range from 5 to 20 degrees. Further, in order to obtain the optimum peak luminance, the view field angle is more preferably set to range from 10 to 20 degrees.

In order to achieve the above described preferable view field angle, the relation between the width W and height H of the lenticular element 30 is set as follows.

Figure 7:
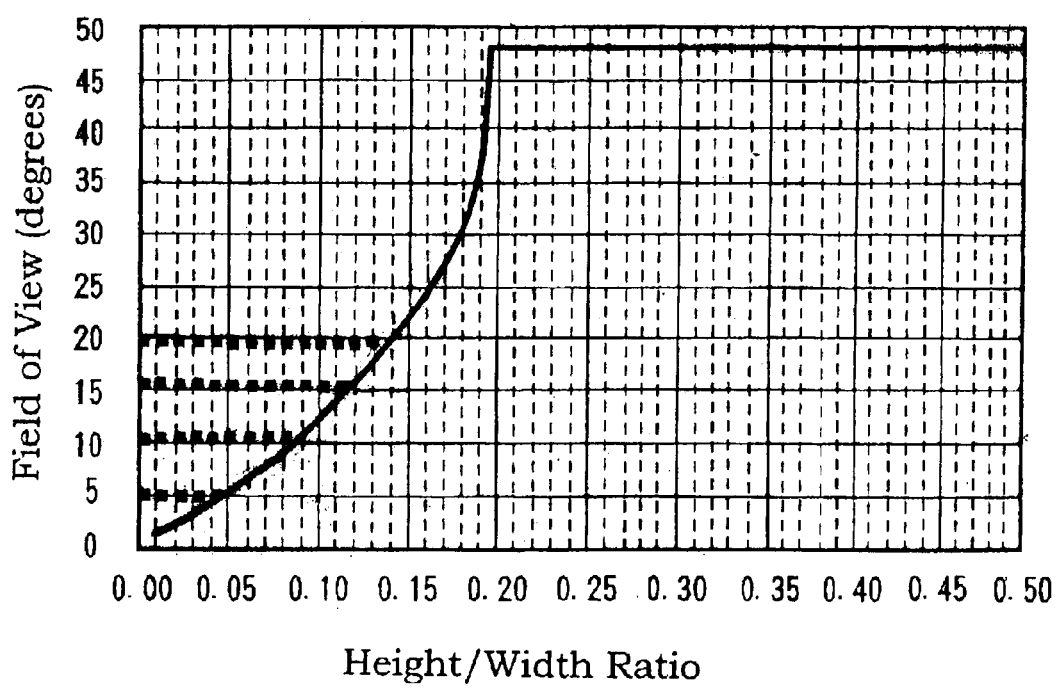
FIG. 7 shows a relation between a height/width and a field of view of the lenticular element shown in FIG. 1.

Referring to FIG. 7, as the ratio of the height H to the width W decreases, the range of view field is narrowed. (The maximum value of view field is decreased.) When the view field angle is desired to range from 5 to 20 degrees, more preferably, from 10 to 20 degrees, the H/W ratio of the lenticular element 30 can be obtained from FIG. 7. In this embodiment, the height H and width W are appropriately determined according to FIG. 7. For example, the H/W ratio is set to about 0.045 for a view field angle of 5 degrees.

the H/W ratio is set to about 0.08 for a view field angle of 10 degrees, the H/W ratio is set to about 0.115 for a view field angle of 15 degrees, and the H/W ratio is set to about 0.14 for a view field angle of 20 degrees.

Figure 8:
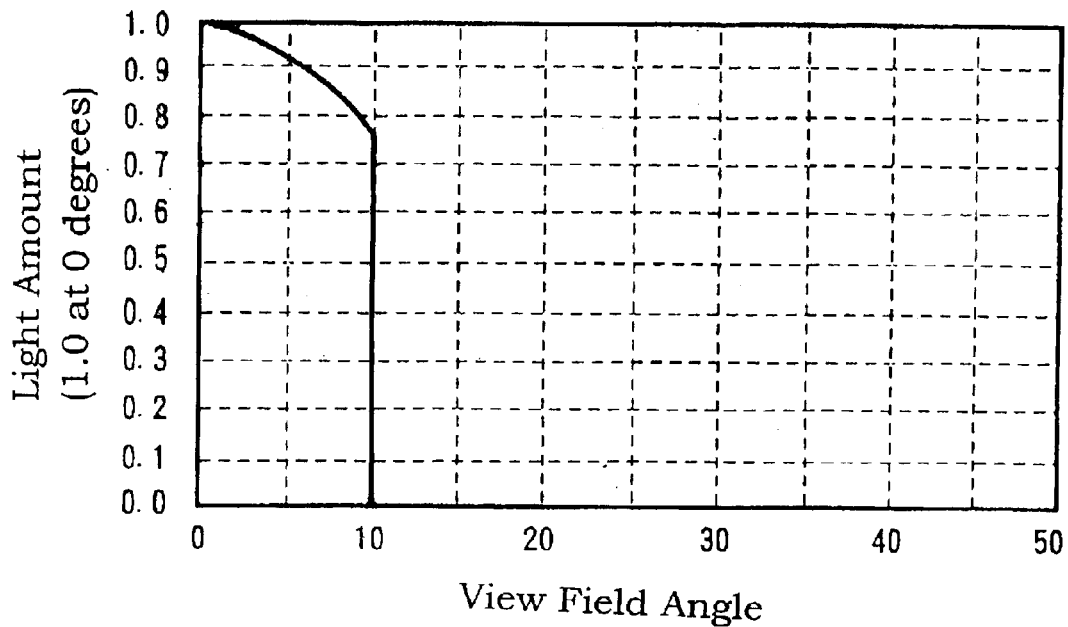
FIG. 8 shows a relation between a view field angle and a light amount of the lenticular element shown in FIG. 1 in case the view field angle is set at 10 degrees.

For example, when the lenticular elements 30 are configured with a view field angle of 10 degrees and an H/W ratio of 0.08, the view field angle distribution as shown in FIG. 8. In this case, as it is clear from the comparison between FIG. 6 and FIG. 8, the outgoing light components existing in the range exceeding a view field angle of 10 degrees in FIG. 6 are eliminated in FIG. 8.

Figure 9:
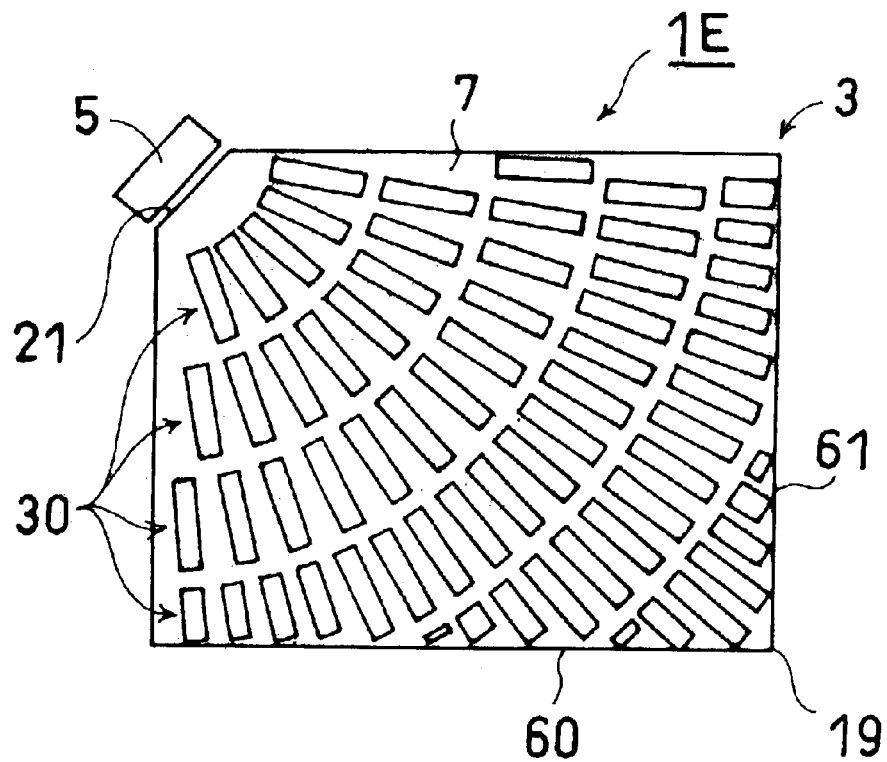
FIG. 9 shows a top plan view of a spread illuminating apparatus according to a second embodiment of the present invention.

And, since the lenticular elements 30 and the light conductive plate 3 are integrally made of the same material in this embodiment the number of parts can be reduced, thereby improving productivity thereof A second embodiment of the present invention will be hereinafter explained with reference to FIG. 9 and also to FIGS. 3 to 5.

In the first embodiment, the plurality of lenticular elements 30 vary in length. On the other hand, in a spread illuminating apparatus 1E according to the second embodiment, most lenticular elements 30 are of the same length, which makes the second embodiment very different from the first embodiment. Further, while in the first embodiment only one lenticular element 30 disposed along the diagonal line 20 has a length substantially equal to the diagonal line 20 (the line connecting the one corner 18 with the other corner 19 of the light conductive plate 3), in the second embodiment a plurality of lenticular elements 30 with a much shorter length are disposed along length of the diagonal line 20.

Small number of lenticular elements 30 having respective lengths shorter than the length of the most lenticular elements 30 are also provided. Specifically, the small number of lenticular elements 30 is provided close to two sides 60 and 61 so as to achieve a uniform area density of arrangement of the lenticular elements 30.

The plurality of lenticular elements 30 are arranged in such a manner as to extend radially with respect to the spot-like light source 5 in a direction perpendicular to the grooves 16A of the light reflection pattern 15A. In the above case, the plurality of lenticular elements 30 extend radially with respect to, to be exact, a middle point on a side line 21. Further, a center of the above-described radial extension does not always have to be the same for all of the plurality of lenticular elements 30.

Figure 10:
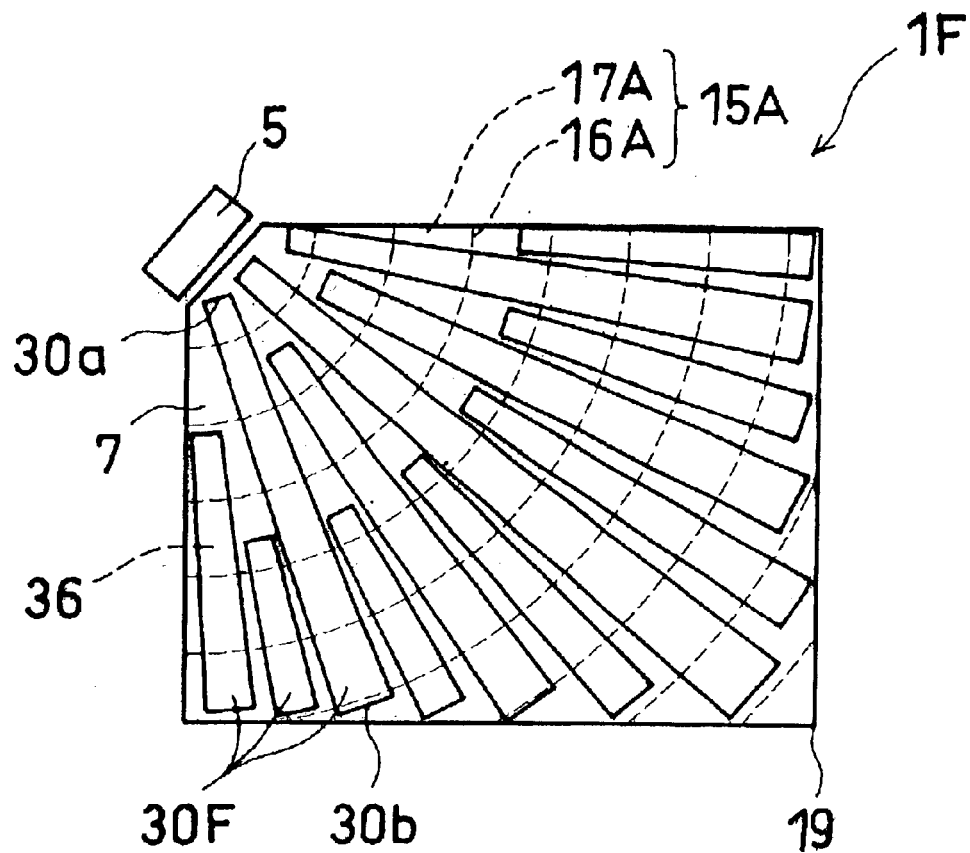
FIG. 10 shows a top plan view of a spread illuminating apparatus according to a third embodiment of the present invention.
Figure 11:
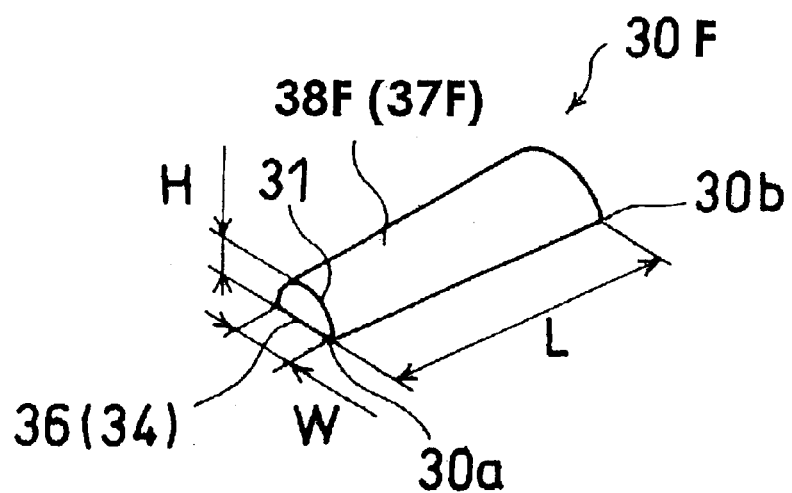
FIG. 11 shows a perspective view of a lenticular element shown in FIG. 10.

A third embodiment of the present invention will be hereinafter explained with reference to FIGS. 10 and 11.

In the first embodiment, the lenticular elements 30 each are configured to have the rectangular bottom surface 36, and to have width W and height H both measuring constant in the longitudinal direction. A spread illuminating apparatus 1F according to the third embodiment has the plurality of lenticular elements 30F configured and arranged as shown in FIGS. 10 and 11.

Specifically, the lenticular elements 30F each have a trapezoidal bottom surface 36, and accordingly a trapezoid shape in a top plan view. Further, while the lenticular element 30F has a constant height H of a prism section 38 in a longitudinal direction, its width W increases gradually from its one end 30a to the other end 30b (in other words, the radius R of a circle including the minor arc 31 (see FIG. 4) increases gradually from the one end 30a to the other end 30b. And, the one end 30a and the other end 30b are parallel to each other, and the one end 30a is shorter than the other end 30b.

The plurality of lenticular elements 30F are of various lengths widely ranging as in the first embodiment and are arranged radially with respect to the spot-like light source 5 with their respective one ends facing the spot-like light source 5.

With the structure above described, open areas between any adjacent lenticular elements 30F are narrowed. Thus, the lenticular elements 30F are more densely arranged than in the first embodiment leaving smaller areas of flat portions FP, whereby the difference in area density of lenticular element arrangement is reduced. Further, in the third embodiment the interruption of lenticular elements in its longitudinal direction can be reduced in comparison with the first and second embodiments. Since light rays incident an interrupted portion are scattered and lost, the third embodiment with a reduced number of interrupted portions can decrease the light rays scattered to be lost in comparison with the other two embodiments.

In the third embodiment, the plurality of lenticular elements 30F are of various lengths widely ranging. Alternatively, like in the second embodiment, most lenticular elements may be of the same length (a fourth embodiment). In the fourth embodiment, the lenticular elements can be arranged more densely than in the third embodiment.

In the embodiments described above, the lenticular element has a cross section, configured by a minor arc and a chord connecting two points which defines the minor arc. However, the cross section does not necessarily have to be configured by a minor arc of a circle with a constant curvature, but may alternatively configured by any curve whose curvature is not constant, such as a part of an ellipse, a parabola and a hyperbola.

Also, in the embodiments, described above, the spot-like light source 5 is set close to or in contact with the light entrance surface 21 formed at the one corner 18 of the light conductive plate 3. Alternatively, the spot-like light source 5 may be set close to or in contact with one side surface of the light conductive plate 3 with a plurality of grooves of the light reflection pattern formed to be perpendicular to the longitudinal direction of the lenticular elements.

Further, in the embodiments described above, the plurality of lenticular elements and the light conductive plate are integrally formed and made of the same material. Alternatively, the plurality of lenticular elements and the light conductive plate may be discretely formed and made of different materials. The discrete structures of the lenticular elements and the light conductive plate ease production.

In the embodiments described above, the present invention is applied as a back light system. However, the present invention is not limited thereto but may be applied as a front light system.

What is claimed is:

1. A spread illuminating apparatus comprising:
    a light conductive plate shaped substantially rectangular and made of a light-transmissible material;
    a spot-like light source disposed close to or in contact with a light entrance surface formed at a corner of said light conductive plate;
    a light reflection pattern formed on a major surface of said light conductive plate and including a plurality of grooves which each extend so as to shape a substantially minor arc with respect to said spot-like light source and which are arrayed concentrically wherein each of said grooves has its depth gradually increasing with increase in a distance from a diagonal line formed on said major surface of said light conductive plate; and
    a plurality of lenticular elements made of a light-transmissible material, provided on a major surface of said light conductive plate opposite to said major surface provided with said light reflection pattern, and having their respective longitudinal directions oriented perpendicular to said plurality of grooves of said light reflection pattern.

2. A spread illuminating apparatus as set forth in claim 1, wherein each of said lenticular elements is rectangular in top plan view.

3. A spread illuminating apparatus as set forth in claim 1, wherein each of said lenticular elements is substantially trapezoidal in top plan view, and which have their respective shorter sides of two parallel sides facing said spot-like light source.

4. A spread illuminating apparatus as set forth in claim 1, wherein said lenticular elements are of various lengths measuring in a wide range.

5. A spread illuminating apparatus as set forth in claim 1, wherein said lenticular elements are mostly of a length identical with one another except a smaller number thereof being of various lengths measuring in a narrow range.

6. A spread illuminating apparatus as set forth in claim 1, wherein said lenticular elements each have a cross section outlined by a minor arc and a chord connecting two points both defining said minor arc.

7. A spread illuminating apparatus as set forth in claim 6, wherein said lenticular elements each have their respective widths and heights set such that view field angles thereof range from 5 degrees to 20 degrees.

8. A spread illuminating apparatus as set forth in claim 1, wherein said lenticular elements and said light conductive plate are formed integrally of one same material.

9. A spread illuminating apparatus as set forth in claim 1, wherein said lenticular elements and said light conductive plate are formed discretely.

10. A spread illuminating apparatus as set forth in claim 1, wherein said plurality of lenticular elements are longitudinally discrete so as to be substantially identical in size and radially provided with a certain space therebetween.

11. A spread illuminating apparatus as set forth in claim 7, wherein said view field angles ranging from 5 degrees to 20 degrees are correspondingly determined in the ratio of said height and said width of said lenticular element setting 0.045 to 0.14.

12. A spread illuminating apparatus comprising:
    a light conductive plate shaped substantially rectangular and made of a light-transmissible material;
    a spot-like source disposed close to or in contact with a light entrance surface formed at a side surface of said light conductive plate;
    a light reflection pattern formed on a major surface of said light conductive plate and including a plurality of grooves which each extend so as to shape a substantially minor arc with respect to said spot-like light source and which are arrayed concentrically wherein each of said grooves has its depth gradually increasing with increase in a distance from an optical axis formed on said major surface of said light conducting plate; and
    a plurality of lenticular elements made of a light-transmissible material, provided on a major surface of said light conductive plate opposite to said major surface provided with said light reflection pattern, and having their respective longitudinal directions oriented perpendicular to said plurality of grooves of said light reflection pattern.

* * * * *